United States Patent [19]

Patrick et al.

[11] 4,198,225
[45] Apr. 15, 1980

[54] MICROCHANNEL PLATE IN WALL FABRICATION, METHOD AND APPARATUS

[75] Inventors: E. Vincent Patrick, Lorton; Lewis C. Spessard, Burke; Kurt Villhauer, Annandale, all of Va.

[73] Assignee: The United States of America as represented by the Secretary of the Army, Washington, D.C.

[21] Appl. No.: 31,813

[22] Filed: Apr. 20, 1979

[51] Int. Cl.² .......................................... C03C 27/08
[52] U.S. Cl. .................................. 65/43; 65/59 A; 65/32; 65/157
[58] Field of Search .............. 65/42, 43, 59 A, 59 R, 65/32, 157, 323

[56] References Cited

U.S. PATENT DOCUMENTS

| | | | |
|---|---|---|---|
| 2,386,820 | 10/1945 | Spencer | 65/32 |
| 2,966,006 | 12/1960 | Sherts et al. | 65/323 |
| 3,214,254 | 10/1965 | Remington | 65/157 X |
| 3,431,326 | 3/1969 | Letter | 65/32 UX |

Primary Examiner—Arthur D. Kellogg
Attorney, Agent, or Firm—Nathan Edelberg; Robert P. Gibson; John E. Holford

[57] ABSTRACT

A method and apparatus is provided for manufacturing microchannel-plate-in-wall structures (MIW's) wherein the electrical properties of the microchannel plate are protected by the localized application of a cover gas.

10 Claims, 4 Drawing Figures

MICROCHANNEL PLATE IN WALL FABRICATION, METHOD AND APPARATUS

The invention described herein may be manufactured, used, and licensed by the U.S. Government for governmental purposes without the payment of any royalties thereon.

BACKGROUND OF THE INVENTION

In patent application Ser. No. 890,899 for a microchannel-plate-in-wall (MIW) structure, filed on even date herewith by Charles F. Freeman and Kurt (NMI) Villhauer, there is shown a novel image intensifier having a microchannel plate (MCP) with integral generally cylindrical sidewalls and two disk-like end assemblies, one being a photocathode and the other a phosphor type viewing screen. The photocathode and viewing screen assemblies differ only slightly from prior art devices, but the sidewalls and microchannel plate are combined in a manner which differs radically from the accepted techniques. The sidewalls are, in fact, permanently attached to the microchannel by a special glass frit which is melted and devitrified. During this process the plate must be protected to insure that none of its electrical properties are altered.

SUMMARY OF THE INVENTION

It is an object of the present invention to provide a method of heat sealing the adjacent edges of a set of cylindrical glass walls to the broad surfaces of a microchannel plate without altering the electrical properties or otherwise damaging the microchannel plate. It is a further object to provide an apparatus which aligns and contacts the above edges and surfaces during sealing and permits localized application of a cover gas to protect the plate during the heat sealing operation.

BRIEF DESCRIPTION OF THE DRAWINGS

The above and other objects of the invention will be best understood by reference to the accompanying drawings, wherein.

DESCRIPTION OF THE PREFERRED EMBODIMENT

Figure 1:
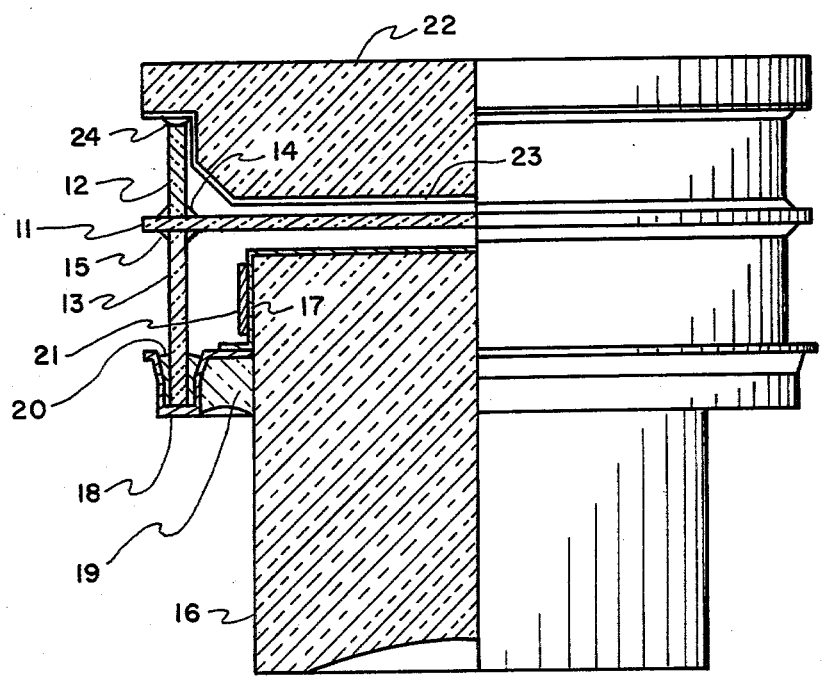
FIG. 1 shows a complete image intensifier tube using a MIW structure.

Referring specifically to FIG. 1, there is shown a complete image intensifier tube utilizing an MIW structure. This structure consists of a microchannel plate (MCP) 11 sealed to wall sections 12 and 13 by means of frit seals 14 and 15. The MCP is formed from semiconducting glass with electrodes or conductors deposited on its surfaces. A MCP with an extra wide rim is preferred, e.g. 1.150 in. O.D. with a minimum electrode diameter of 1.123 in. and an active area (channeled portion) having a maximum diameter of 0.775 in. The glass wall sections are made of a lead glass, which has just sufficient conductivity to remove surface charge. For simplicity the walls are assumed to be hollow right circular cylinders or rings, although many other non-uniform cross-sectional shapes can obviously be used.

The viewing or anode end of the tube is closed by a twisted fiber-optic faceplate 16, which inverts the visible image. A phosphor screen 17 coated on the inside of the faceplate produces the visible image and includes a conventional conductive layer which extends to and contacts the anode terminal 18. This terminal is fused to the faceplate by a glass seal 19. This same terminal is then sealed to the MIW by melting an indium ring 20 between the two in the trough provided by the terminal. A ring of conventional getter material 21 is formed on the inside of the anode end assembly to preserve the hard vacuum inside the completed tube. The opposite end of the tube is closed by a cathode assembly consisting of a faceplate 22 having a photocathode 23 with an electrode which extends to the outer edge of the faceplate. This faceplate is also sealed to the MIW by an indium seal 24 which can be cold pressed or heated. The terminals deposited on the MCP, like the one on the cathode terminal, extend through the seals 14 and 15 beyond the wall sections 12 and 13 for external connection to a power source. The terminal patterns on the MCP can thus be made quite complex. For example, each broad face may have a plurality of parallel metal strips, orthogonally related between faces, to permit selective x-y switching of the numerous channels, without the need for a special array of output terminals sealed through the tube.

Figure 2:
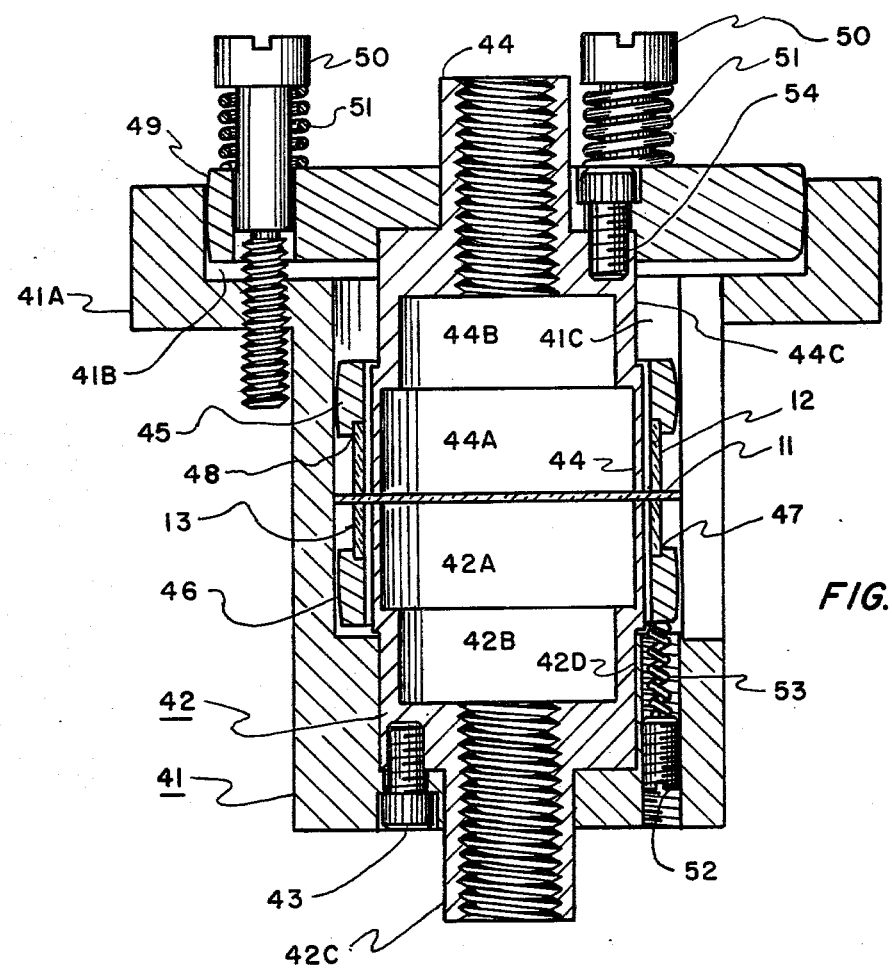
FIG. 2 shows a fixture holding a MIW structure prior to sealing of the walls to the microchannel plate.

FIG. 2 shows a fixture holding the parts of the MIW structure in position during its manufacture. The body 41 of the fixture is generally cylindrical with an outside diameter substantially greater than that of the microchannel plate. The upper end terminates in a thick flange 41A of still greater diameter. The body is bored through and counterbored from the upper end to accept the stepped end of a lower cup member 42. It is further counterbored more than half its length from the upper end to receive the microchannel plate in a recess 41C and the flange is counterbored to a diameter between its outer diameter and that of the rest the body to form a pressure plate recess 41B. The cup member 42 has a maximum diameter open end within the recess 41C greater than the diameter of the active area of the microchannel plate, i.e. the area containing channel openings; but substantially smaller than the maximum diameter of the plate. The cup member is bored through and counterbored twice to form the two slightly different recesses 42A and 42B within the cup member. The diameter of the larger recess 42A is also larger than that of the active area of the plate. The outer diameter of the bottom portion of this lower cup member is twice reduced to form the portions 42C and 42D which define the stepped end mentioned above. The portion 42D extends a very short distance into the recess 41C so that the stepped end will seal well in the body member 41. The inner wall of the lower cup member below the recesses 42A and 42B is threaded to receive a standard male conduit fitting (not shown). The body and lower cup are drilled and tapped for at least one, preferably three, screws 43 which hold them together.

An upper cup 44 with counterbored recesses 44A and 44B and a pair of retaining rings 45 and 46 are also located in thre recess 41C. The outer surface of the rings are rounded to approximate the surface of a sphere that would just slideably fit within recess 41C. The inner diameter of the rings is somewhat larger than the outer diameter of the cups to provide a narrow clearance space therebetween. The inner proximate edges of the rings are provided with steps 47 and 48 which match the edges of the tube side walls 12 and 13. The inner diameter of the rings can conveniently be made equal to the same diameter of the walls, if desired, and the rings preferably are matched to one another. A pressure plate 49 is provided which just fits the flange recess 41B. The edges of this plate are rounded in a manner similar to the outer surfaces of the rings to provide an easy sliding, but close fit. The plate is drilled through and counterbored at its center to receive the stepped upper portion of cup 44, which is preferably identical to the lower cup. The plate is also drilled and counterbored to match the threaded cup holes, as provided for screws 43, to receive plate screws 54, and the pressure screws 50. The latter are placed near the edge of the plate and are received in holes drilled and tapped through the flange below the recess 41B. Three symmetrically located pressure screws are preferred, symmetrically offset from screws 54. Each pressure screw is provided with a similar compression spring 51 coiled around its stem between its head and the pressure plate. At a plurality of points directly below the lower ring the body is drilled through and tapped for a set screw 52. A compression spring 53 shorter than the tapped hole for screw 52 is placed therein and the screw adjusted so that part of the spring projects into the body recess 41C. Again three symmetrically located screws are preferred, symmetrically offset from screw 43. All parts are preferably made of stainless steel to prevent contamination of the MIW structure.

Figure 3:
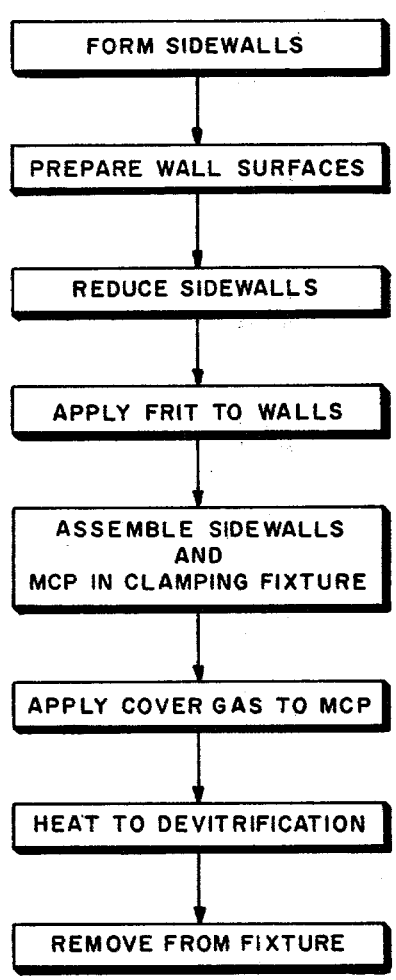
FIG. 3 is flow chart of the method of assemblying a MIW.

Referring to the Flow Chart in FIG. 3 the MIW is fabricated as follows:

A. The sidewalls are formed by any of the well known techniques for making hollow glass cylinders with plane edges normal to their axis to moderate tolerance, e.g. centrifugal molding, using a high lead content glass, having the same coefficient of thermal expansion as the MCP such as G12 glass made by the Kimble Glass Co., and then ground and polished within a few thousandths of an inch of its required dimensions (e.g. 1.030" O.D. and 0.15–0.30 axially);

B. The surfaces of the walls are thoroughly cleaned using solvents such as water, acetone and alcohol. Commercially available MCP's with Inconel electrodes have already received all the surface treatment that is required for the frit mentioned above, other MCP's and/or frits may require the deposition of a layer of $SiO_x$ where x lies between 1 and 2 (preferably near 1) at least on the rim;

C. These cylindrical walls are then placed in an oven and heated to 450° C. for one hour in a hydrogen atmosphere to reduce the lead in the glass thereby providing a degree of conductivity therein;

D. One toroidal end surface of each wall is then coated with a mixture of glass frit (sealing glass Corning Code 7275) mixed 14 to 1 by weight with amyl acetate having 1.2% nitrocellulose dissolved therein. The frit coating on the glass wall is then dried and glazed. The glazing is performed at a temperature below the devitrification point, which burns off the binder and fuses the frit powder into a mechanically strong vitreous coating, the glazed frit may then be mechanically shaped as required to obtain a desired uniform 0.010 inch thick coating on the end faces of the walls.

E. The walls and microchannel plate are then assembled in the fixture of FIG. 1, ring 46 is first floated with its stepped edge upward on the springs 53, the lower wall is inserted in that ring with the frit covered edge upward, the microchannel plate is placed on the lower wall, the upper wall is placed fritted edge down on the MCP, the upper wall is centered by placing the upper ring on the top edge thereof and manually adjusting the wall until it seats itself in the ring, the upper cup and pressure plate are inserted and screws 50 and 52 adjusted to apply firm and even pressure to the various parts in the fixture, the fixture is kept in an upright position so that ring 45 will gravitate toward the upper wall and the MCP applying pressure therebetween, thus maintained the fixture is nested in a suitable supporting rack, placed in an oven and the upper and lower ends coupled to male conduit connectors therein. Before proceeding further with the method, the oven and cover gas system will be described.

Figure 4:
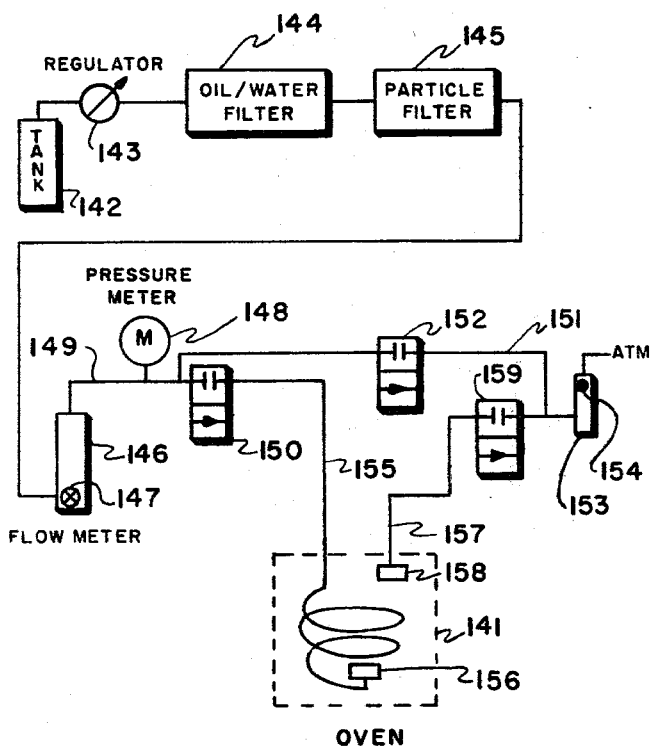
FIG. 4 shows an oven and cover gas supply system which supports the fixture of FIG. 2.

FIG. 4 shows the oven 141 and a cover gas supply system. The cover gas (argon) is supplied under pressure from a tank 42 to a regulator valve 143 which sets the supply pressure for the system. After passing through the regulator valve 143, any oil or water vapor is removed from the gas by a Matheson MDL 450 filter 144 and other particulate matter by an MDL 6134 filter 145. The gas then passes through a first Matheson 602 flowmeter 146 having an integral input valve 147, which controls the inflow to the oven. A pressure gauge 148 monitors the output line 149 from this flowmeter. The output line 149 feeds the input port on a first on-off valve 150. Line 149 is also connected to a by-pass line 151 through a second on-off valve 152. The bypass line 151 is also connected to the input port of a second flowmeter 153 like the flowmeter 146 but having its valve 154 at the output end, which end is then vented to the atmosphere. The input line 149 is coupled to an oven input line through the valve 150. The latter line spirals around the walls of the oven 141 to preheat the gas and terminates in the male coupling 156 which engages the bottom of the fixture. An oven output line 157 runs from the remaining male coupling 158 at the top of the fixture to the input port of a third on-off valve 159. The output port of the valve 159 is coupled to line 151.

Returning to the Flow Chart of FIG. 3, the MCP and sidewalls having been assembled in the clamping fixture and the latter having been mounted in the oven, the MIW fabrication proceeds as follows:

F. With all valves of FIG. 4 initially in their off or closed positions, the valve 147 on flowmeter 146 is fully opened and regulator valve 143 is adjusted to provide an input gauge pressure to meter 148 at 10 psig. At this time the seal between the cups and the MCP is adjusted. A positive pressure bias must be maintained inside the cups before the MCP can be heated to prevent any oxidizing gases from reaching the active surface of the MCP, while the leak rate through the seal must be sufficiently small to not totally purge the oxidizing atmosphere at the frit. Valve 150 is then opened. With valve 147 fully open, the pressure screws of the fixture are manually adjusted until the meter 148 reads less than one psig below the original 10 psig or a desired leak rate is established by meter 146. Next, the flow and fixture pressure of the cover gas are set. Valve 159 is opened and by adjusting valves 147 and 154, the leak rate, input flow, input flow, output flow (meter 153) and the pressure bias of the fixture are established (not all independently). Typically, the input flow is 150 mm (approximately 700 cc/min), the output flow is 120 mm, the pressure bias (meter 148) is 6 psig, and, thus, the leak rate is the input flow less the output flow. Bypass valve 152 is used for calibration purposes; to compare flow meter readings and to determine the upper bound for the fixture pressure, i.e. leak free conditions.

G. With the cover gas flow established (purging time 10-15 minutes), the glass frit is heated by toroidal heating elements in the oven wall. The temperature of the oven is raised gradually (approx 25° C./min) to 260° C., held for 10 minutes and then gradually raised to 450° C. At this temperature the frit melts and devitrifies. After baking for one hour the oven is allowed to cool for 30 minutes without forced air cooling and 30 additional minutes with a cooling fan until the fixture temperature falls below 50° C. The cover gas, which first strikes the electrode on the electron input side of the MCP, protects the plate from damage. Only a slight discoloration of the electrode on the output side occurs with no observable effect on its performance in a finished intensifier tube assembly.

H. The gas flow is now cut off by closing valve 150.

I. The fixture is then decoupled from the oven, disassembled and the finished MIW structure removed. The edges of the cups must be kept clean and smooth to produce a good seal with the MCP, so it is particularly important that they be removable. Polyimide wire enamels sold under the DUPONT trade name "PYRE-M.L." can be used on the cup edges, if desired, to improve the seal. Further processing of the MIW structure into an image intensifier tube is the subject of the copending patent application mentioned above.

Obviously many variations of the above methods and apparatus will be obvious to those skilled in the art but the invention is limited only by the claims which follow.

We claim:

1. The method of fabricating a microchannel plate-in-wall structure, consisting of an MCP and two hollow generally cylindrical glass wall sections with normal plane edges surrounded by an oxidizing atmosphere, said method comprising the steps of:
    coating one edge of each of said wall sections with a layer of glass frit;
    pressing each of said edge portions against an opposite side of said MCP whereby a portion of each electrode on said MCP, spaced radially outward from the channels thereon, is bridged by one of said edge portions;
    isolating said channels from said oxidizing atmosphere;
    heating said frit at least to its melting point; and
    cooling the resulting structure to room temperature.

2. The method according to claim 1 wherein said coating step further comprises the steps of:
    mixing eight to fourteen parts by weight of glass frit with one part of amyl acetate containing 1.2 percent by weight by nitrocellulose;
    applying the resultant mixture to said one edge;
    drying the resulting coating; and
    mechanically shaping the coating to a uniform thickness of 0.010 inches.

3. The method according to claim 1 further including the step of:
    flowing an inert cover gas over and through the isolated portions of said MCP after isolating said channels, but before the frit is heated, and continuing to flow said gas while heating until said resultant structure has cooled to room temperature.

4. The method according to claim 1 wherein said gas is argon.

5. The method according to claim 1 wherein:
    said frit is further heated to its devitrification temperature.

6. A fixture for holding an MCP between two hollow cylindrical glass wall sections while the resulting structure is heated and sealed together, comprising:
    first and second tubular cup members open at their largest diameter end having a conduit coupling at their small diameter end;
    the rim of said MCP being interposed between and contacting said open ends;
    a body member surrounding said cup members engaging and axially aligning said first cup member and said MCP with said body member;
    a pressure plate means, spring coupled between said body member and said second cup member, to align said first and second cups and to vary the pressure between said open ends and said MCP;
    a first retaining ring means spring coupled between said body member and a first of said wall sections to vary the pressure between said first wall section and said MCP and to align the axes thereof, said body member being oriented such that said first wall section lies below said MCP;
    a second retaining ring means resting on the top edge of said second wall section to press same against said MCP, said second retaining ring means being shaped to radially restrain the edges of said second wall section remote from said MCP and thereby align the axis of said second section with said MCP relative said body.

7. The fixture according to claim 6 wherein:
    said first and second cup members are interchangeable.

8. The fixture according to claim 6 wherein:
    said retaining rings are interchangeable.

9. The fixture according to claim 6 wherein:
    the outer surface of said rings substantially define a portion of the surface of a sphere having a great circle the entire circumference of which that slideably engages the inner surface of said body member.

10. The fixture according to claim 6 wherein:
    said larger diameter ends of said cup members are coated with a polymide material.

* * * * *